United States Patent
Pajukoski et al.

(10) Patent No.: US 9,414,366 B2
(45) Date of Patent: Aug. 9, 2016

(54) TIMESLOT ALLOCATION IN UPLINK CDMA

(75) Inventors: Kari Pekka Pajukoski, Oulu (FI); Kari Juhani Hooli, Oulu (FI); Pasi Eino Tapio Kinnunen, Oulu (FI); Timo Erkki Lunttila, Espoo (FI); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 73 days.

(21) Appl. No.: 14/352,714

(22) PCT Filed: Oct. 20, 2011

(86) PCT No.: PCT/EP2011/068367
§ 371 (c)(1),
(2), (4) Date: May 1, 2014

(87) PCT Pub. No.: WO2013/056741
PCT Pub. Date: Apr. 25, 2013

(65) Prior Publication Data
US 2014/0254536 A1 Sep. 11, 2014

(51) Int. Cl.
*H04W 4/00* (2009.01)
*H04W 72/04* (2009.01)
*H04W 88/08* (2009.01)

(52) U.S. Cl.
CPC ...... *H04W 72/0413* (2013.01); *H04W 72/0466* (2013.01); *H04W 4/005* (2013.01); *H04W 72/0446* (2013.01); *H04W 88/08* (2013.01); *Y02B 60/50* (2013.01)

(58) Field of Classification Search
CPC ....... H04W 4/06; H04W 72/04; H04W 88/08; H04W 76/00; H04B 7/2045; H04B 7/208; H04B 7/216; H04B 7/2123; H04B 7/2121; H04B 7/212; H04L 2012/5608

USPC ......... 370/312, 319–322, 329, 335, 337, 341, 370/342, 344, 347, 348
See application file for complete search history.

(56) References Cited

U.S. PATENT DOCUMENTS

| 2002/0191569 A1* | 12/2002 | Sung | ...................... H04J 13/00 370/335 |
| 2009/0109907 A1* | 4/2009 | Tsai | ......................... H04J 4/00 370/329 |

(Continued)

FOREIGN PATENT DOCUMENTS

WO     WO 02/063908 A1     8/2002

OTHER PUBLICATIONS

Orfanos, Georgios, et al., "A Centralized MAC Protocol with QOS Support for Wireless LANS", © 2007 IEEE, 5 pgs.

(Continued)

*Primary Examiner* — Brenda H Pham
(74) *Attorney, Agent, or Firm* — Harrington & Smith

(57) ABSTRACT

The invention relates to an apparatus including at least one processor and at least one memory including a computer program code, the at least one memory and the computer program code configured to, with the at least one processor, cause the apparatus at least to: allocate at least one specific uplink resource for uplink shared channel data to at least one device operable at decreased transmission power and/or bit rate, wherein the at least one specific uplink resource is at least one frequency resource and/or at least one time resource, and wherein the at least one specific uplink resource includes a plurality of reference symbols, and if a plurality of devices are allocated, separate the devices on the at least one specific uplink resource by multiplexing, wherein the multiplexing includes code division multiplexing.

31 Claims, 1 Drawing Sheet

(56) References Cited

U.S. PATENT DOCUMENTS

2010/0215011 A1\* 8/2010 Pan ................... H04L 5/0064 370/329
2012/0046032 A1\* 2/2012 Baldemair ............ H04L 5/0053 455/434

OTHER PUBLICATIONS

Walke, B., "Mobilfunknetze und ihre Protokolle", Jan. 1, 2000, Stuttgart, Germany, 22 pgs.

\* cited by examiner

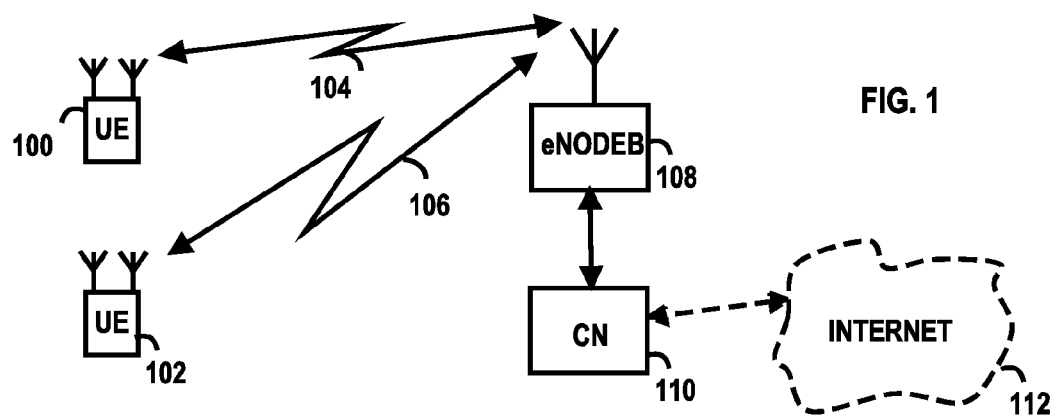
FIG. 1
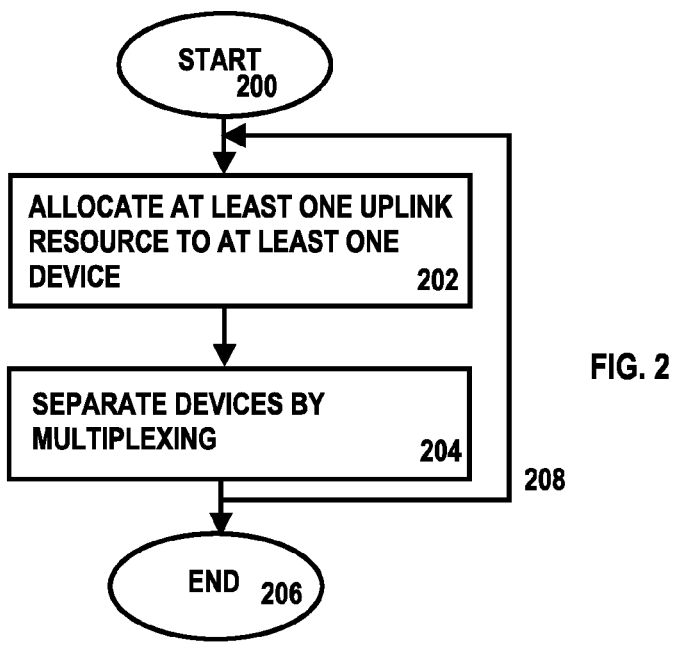
FIG. 2
FIG. 3
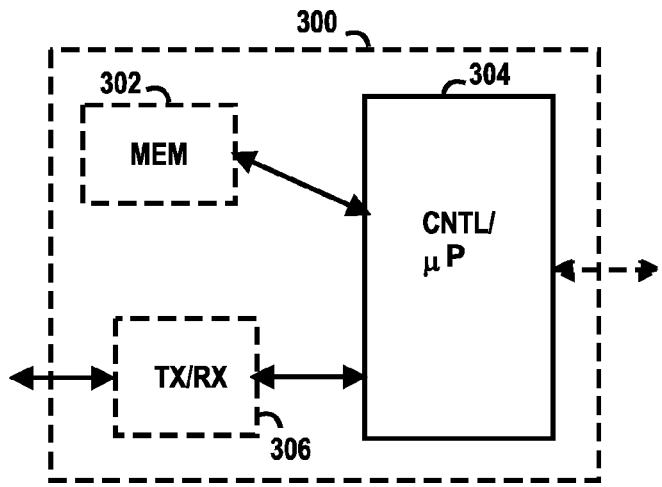

TIMESLOT ALLOCATION IN UPLINK CDMA

FIELD

The invention relates to apparatuses, methods, systems, computer programs, computer program products and computer-readable media.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Support for machine type communication (MTC) or corresponding devices or services in general has attracted attention.

Machine type communication is also called machine-to-machine (M2M) communication. Unlike human to human (H2H) communications which many communications networks are currently targeted to, M2M communication is seen as a means for data communication between entities that do not necessarily need human interaction.

BRIEF DESCRIPTION

According to an aspect of the present invention, there is provided an apparatus comprising: at least one processor and at least one memory including a computer program code, the at least one memory and the computer program code configured to, with the at least one processor, cause the apparatus at least to: allocate at least one specific uplink resource for uplink shared channel data to at least one device operable at decreased transmission power and/or bit rate, wherein the at least one specific uplink resource is at least one frequency resource and/or at least one time resource, and wherein the at least one specific uplink resource comprises a plurality of reference symbols, and if a plurality of devices are allocated, separate the devices on the at least one specific uplink resource by multiplexing, wherein the multiplexing comprises code division multiplexing.

According to yet another aspect of the present invention, there is provided a method comprising: allocating at least one specific uplink resource for uplink shared channel data to at least one device operable at decreased transmission power and/or bit rate, wherein the at least one specific uplink resource is at least one frequency resource and/or at least one time resource, and wherein the at least one specific uplink resource comprises a plurality of reference symbols, and if a plurality of devices are allocated, separating the devices on the at least one specific uplink resource by multiplexing, wherein the multiplexing comprises code division multiplexing.

According to yet another aspect of the present invention, there is provided an apparatus comprising: means for allocating at least one specific uplink resource for uplink shared channel data to at least one device operable at decreased transmission power and/or bit rate, wherein the at least one specific uplink resource is at least one frequency resource and/or at least one time resource, and wherein the at least one specific uplink resource comprises a plurality of reference symbols, and means for separating the devices on the at least one specific uplink resource by multiplexing, wherein the multiplexing comprises code division multiplexing, if a plurality of devices are allocated According to yet another aspect of the present invention, there is provided a computer program embodied on a computer-readable storage medium, the computer program comprising program code for controlling a process to execute a process, the process comprising: allocating at least one specific uplink resource for uplink shared channel data to at least one device operable at decreased transmission power and/or bit rate, wherein the at least one specific uplink resource is at least one frequency resource and/or at least one time resource, and wherein the at least one specific uplink resource comprises a plurality of reference symbols, and if a plurality of devices are allocated, separating the devices on the at least one specific uplink resource by multiplexing, wherein the multiplexing comprises code division multiplexing.

LIST OF DRAWINGS

Some embodiments of the present invention are described below, by way of example only, with reference to the accompanying drawings, in which FIG. 1 illustrates an example of a system;

FIG. 2 is a flow chart, and

FIG. 3 illustrates examples of apparatuses;

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user device, such as a user terminal, as well as to any network element, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A), that is based on orthogonal frequency multiplexed access (OFDMA) in a downlink and a single-carrier frequency-division multiple access (SC-FDMA) in an uplink, without restricting the embodiments to such an architecture, however. It is obvious for a person skilled in the art that the embodiments may also be applied to other kinds of communications networks having suitable means by adjusting parameters and procedures appropriately.

In an orthogonal frequency division multiplexing (OFDM) system, the available spectrum is divided into multiple orthogonal sub-carriers. In OFDM systems, the available bandwidth is divided into narrower sub-carriers and data is transmitted in parallel streams. Each OFDM symbol is a linear combination of signals on each of the subcarriers. Further, each OFDM symbol is preceded by a cyclic prefix (CP), which is used to decrease Inter-Symbol Interference. Unlike in OFDM, SC-FDMA subcarriers are not independently modulated.

Typically, a (e)NodeB ("e" stands for evolved) needs to know channel quality of each user device and/or the preferred precoding matrices (and/or other multiple input-multiple output (MIMO) specific feedback information, such as channel quantization) over the allocated sub-bands to schedule transmissions to user devices. Such required information is usually signalled to the (e)NodeB.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

FIG. 1 shows a part of a radio access network based on E-UTRA, LTE, LTE-Advanced (LTE-A) or LTE/EPC (EPC=evolved packet core, EPC is enhancement of packet switched technology to cope with faster data rates and growth of Internet protocol traffic). E-UTRA is an air interface of Release 8 (UTRA=UMTS terrestrial radio access, UMTS=universal mobile telecommunications system). Some advantages obtainable by LTE (or E-UTRA) are a possibility to use plug and play devices, and Frequency Division Duplex (FDD) and Time Division Duplex (TDD) in the same platform.

FIG. 1 shows user devices 100 and 102 configured to be in a wireless connection on one or more communication channels 104, 106 in a cell with a (e)NodeB 108 providing the cell. The physical link from a user device to a (e)NodeB is called uplink or reverse link and the physical link from the NodeB to the user device is called downlink or forward link.

The NodeB, or advanced evolved node B (eNodeB, eNB) in LTE-Advanced, is a computing device configured to control the radio resources of communication system it is coupled to. The (e)NodeB may also be referred to as a base station, an access point or any other type of interfacing device including a relay station capable of operating in a wireless environment.

The (e)NodeB includes transceivers, for example. From the transceivers of the (e)NodeB, a connection is provided to an antenna unit that establishes bidirectional radio links to user devices. The antenna unit may comprise a plurality of antennas or antenna elements. The (e)NodeB is further connected to core network 110 (CN). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

A communications system typically comprises more than one (e)NodeB in which case the (e)NodeBs may also be configured to communicate with one another over links, wired or wireless, designed for the purpose. These links may be used for signalling purposes.

The communication system is also able to communicate with other networks, such as a public switched telephone network or the Internet 112. The communication network may also be able to support the usage of cloud services. It should be appreciated that (e)NodeBs or their functionalities may be implemented by using any node, host, server or access point etc. entity suitable for such a usage.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device.

The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

It should be understood that, in FIG. 1, user devices are depicted to include 2 antennas only for the sake of clarity. The number of reception and/or transmission antennas may naturally vary according to a current implementation.

Further, although the apparatuses have been depicted as single entities, different units, processors and/or memory units (not all shown in FIG. 1) may be implemented.

It is obvious for a person skilled in the art that the depicted system is only an example of a part of a radio access system and in practise, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a Home(e)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e)NodeBs of FIG. 1 may provide any kind of these cells. A cellular radio system may be implemented as a multilayer network including several kinds of cells. Typically, in multilayer networks, one node B provides one kind of a cell or cells, and thus a plurality of (e) Node Bs are required to provide such a network structure.

In FIG. 1, node (e)NodeB 114 may also be a Home(e)Node B or pico or femto node. It is operably coupled 120 to the (e)NodeB 108 which may provide a macro cell or a primary communication system cell. User device 116 depicts a user device communicating with the (e)NodeB via a radio link 118. The (e)NodeB may be coupled to the core network 110 directly 122 or indirectly via another network node. The (e)NodeBs may belong to different operators and use different core network as well.

Recently for fulfilling the need for improving the deployment and performance of communication systems, concept of "plug-and-play" (e)Node Bs has been introduced. Typically, a network which is able to use "plug-and-play" (e)Node (e)Bs, includes, in addition to Home (e)Node Bs (H(e)nodeBs), a home node B gateway, or HNB-GW (not shown in FIG. 1). A HNB Gateway (HNB-GW), which is typically installed within an operator's network aggregates traffic from a large number of HNBs back to a core network through Iu-cs and Iu-ps interfaces.

In the following, some embodiments are disclosed in further details in relation to FIG. 2. An embodiment is especially suitable for optimising coverage and/or capacity for low bit rate communication.

Support for machine type communication (MTC) or for corresponding devices or services in general especially on open systems interconnection reference model (OSI-model) Layer 1 has attracted attention. One aspect of interest is coverage enhancement.

Machine type communication is also called machine-to-machine (M2M) communication. Unlike human to human (H2H) communications which many communications networks are currently targeted to, M2M communication is seen as a means for data communication between entities that do not necessarily need human interaction. Machine type communication is foreseen to have a large number of communicating devices as well as small and infrequent traffic transmission per each device. Typically, devices communicating under this scenario are so-called smart devices encompassing applications in variety of fields, such as healthcare, manufacturing, home appliances, security services and energy consumption (smart grid technology). Since MTC traffic is basically automated of the nature, it may generate very high simultaneous network loads, causing disturbances of higher value services or even network outages.

Since MTC or other low bit rate traffic sets some requirements to the network which differ from those of human-to-human (H2H) communication, optimising the physical layer for low cost MTC devices has raised interest. Some aspects which should be taken into consideration are low transmission power and spectral efficiency optimisation with small data packets. It should also be understood that for the sake of network optimisation, radio coverage should be maintained as unchanged as possible. This results to the fact that smaller transmission power may need to be compensated by longer transmission time.

In the LTE, user data is carried by the physical uplink shared channel (PUSCH). For PUSCH, LTE Release 8 specifications include subframe bundling for improved coverage. In the subframe bundling, a single transmission block is repeated over 4 consecutive sub-frames. However, subframe bundling is not well-suited for increasing coverage for MTC, because minimum allocation granularity becomes too high and repetition coding needed for sufficient wide area coverage wastes orthogonal resources.

In the LTE, Layer 1/Layer 2 control signalling is divided into two classes depending on whether uplink data is present: when uplink data is present, control signalling takes place on PUSCH and when it is absent, control signalling takes place on a physical uplink control channel (PUCCH). PUCCH is a shared frequency/time resource reserved exclusively for user device to transmit Layer 1/Layer 2 control signals. On PUCCH, different user devices are separated by means of frequency division multiplexing (FDM) and code division multiplexing (CDM). FDM is only used between resource blocks, whereas CDM is used inside a PUCCH resource block.

An uplink demodulation reference signal (DMRS) is time-multiplexed with uplink data. For PUSCH, one DMRS block per slot is provided. The control of the number of reference signals is not provided. It is known that optimum number of reference signals typically depends on the operation point of a signal-to interference and noiseratio (SINR), coherence time, the bandwidth of a radio channel and allocation granularity in frequency and time domains. Due to low transmission power and bit rate, MTC devices often operate with a low SINR causing the risk of the number of reference signals on PUSCH (in other words reference signal power) being too low for achieving the best possible performance.

One embodiment may be carried out by a node, server or host, etc. The embodiment starts in block 200. The embodiment may be carried out for conveying uplink shared channel data.

In block 202, at least one specific uplink resource for uplink shared channel data is allocated to at least one device operable at decreased transmission power and/or bit rate, wherein the at least one specific uplink resource is at least one frequency resource and/or at least one time resource, and wherein the at least one specific uplink resource comprises a plurality of reference symbols. A specific uplink resource may comprise one slot or subframe. In which case the allocation of resources may be extended in such a manner that the specific uplink resource comprises a plurality of slots or subframes. The exact number of slots and/or subframes may vary according to current circumstances.

One target of allocating devices arranged to operate at a lower transmission power and/or bit rate than that of H2H devices, is to optimise coverage and capacity multiplexing. This optimisation is typically carried out for uplink shared data transmission. Devices having lower transmission power and/or low bit rates may be allocated to a special frequency and/or time resource.

Decreased transmission power and/or bit rate may mean lower transmission powers and/or bit rates used in MTC applications (decreased compared to those of H2H applications), they may be in relation to a specific user device category (such as a user device class operating at a lower maximum transmission power than other user devices), or they may be in relation to resources which are semi-statically configurable to lower transmission power and/or bit rate, etc. Reasons or motivations to decrease transmission power and/or bit rate or to operate at such resources as well as the amount of the decrease may vary according to current needs or applications. It should also be understood that the baseline for determining the meaning of "decrease" may vary case by case due to vast variety of possible implementation options.

In one embodiment, a specific uplink frequency and/or time resource may equal or correspond to physical uplink control channel (PUCCH) format 3, or to PUCCH format 3 with extended payload, bandwidth and/or transmission time interval (TTI).

In another embodiment, devices located in a critical coverage area may be allocated to the specific uplink frequency and/or time resource.

In yet another embodiment, specific uplink resources may be cell specific and signalled to a user device by radio resource control (RRC) signalling or broadcasting. The allocation is typically carried out dynamically, thus a user device may automatically change its transmission format.

The dynamic resource allocation may comprise a demodulation reference signal cyclic shift indicator (DM RS CSI) field in an uplink scheduling grant message, in addition to, replacing or included in a DM RS cyclic shift, indicating used spreading code for data and a potential demodulation reference signal cyclic shift orthogonal cover code (DM RS OCC). As an example, a user device scheduled to transmit uplink shared channel (SCH) data on top of PUCCH format 3 resources may, instead of a regular PUSCH, use that format to convey data. Hence, the usage of the DM RS CSI may be extended to resource allocation needed in a CDM based access.

In block 204, if a plurality of devices are allocated, the devices are separated on the at least one specific resource by multiplexing, wherein the multiplexing comprises code division multiplexing. Separating devices by multiplexing provides an option to improve orthogonalisation of DM RS by using spreading codes.

It should be understood that in a typical case, a plurality of devices, users or groups of them are served and thus a need exists to separate them from each other.

On the other hand, in the special case of only one device or user or group of them being served, separation may not be required. It should also be appreciated that the number of devices using a specific resource may vary within time when new devices arrive and devices using the specific resource end their usage.

A multiplexing method suitable for device separation may be a combination of frequency division multiplexing (FDM) and code division multiplexing (CDM) instead of normally used FDM. Another example is CDM alone. The usage of CDM (alone or combined with another modulation method) for low data rate enables finer resource allocation granularity typically resulting to improved multiplexing capacity. The CDM usually also provides smaller deviation in a SINR distribution compared to FDM. Hence, CDM may provide coverage improvement for shared data transmission.

In one embodiment, a first transmission (of a hybrid automatic repeat request (HARQ) process) uses as a transmission format the combination of CDM and FDM, whereas a retransmission uses a Rel-10 transmission format that is FDM. This enables a reasonable retransmission scheduling on normal PUSCH resources, when frequency and/or time resources for the combination transmission format are used mainly for first transmissions of semipersistent allocations, such as voice over internet (VoIP).

In another embodiment, a retransmission may be triggered by means of a physical hybrid automatic repeat request indicator channel (PHICH) uplink resource, such as a first physical resource block (PRB) carrying uplink data, together with an index of a spreading sequence and/or a DM RS CSI.

In yet another embodiment, transmission format for a retransmission may be selected by using a modulation and coding scheme (MCS) value. In the LTE, the MCS indicates a modulation order and code rate of a transmission. Transmission format mapping to MCS values may be predetermined or configured via radio resource control (RRC) signalling. In this option, a user device may select a transmission format (legacy (H2H format) or the combination format of CDM and FDM, etc.) based on allocated MCS. Additionally, a DM RS CSI field may be used to indicate a spreading sequence in a corresponding manner as described above. It should be understood that usually, the usage of a CDM-based MTC-format is with relation to modulation and/or coding method used. For example, a user device reads an MCS value from an uplink resource allocation grant message and interprets other parts of the message, in this case especially a DM RS CSI-field, for deriving the channel code used in connection to CDM.

Alternatively, for a retransmission, an indication for a user device to use one or more specific (uplink) resources may be included into an uplink grant message. The indication may be a single bit, codepoint, etc.

The user device may be configured to use the specific uplink resources on a semi-static or dynamic manner by radio resource management as well.

It should be appreciated that the number of reference symbols may be increased to compensate decreased transmission power, decreased received power and/or increased data rate.

The number of reference symbols may be optimized for poor signal-to-noise (SNR) conditions. This optimisation typically results in increased number of reference symbols compared to H2H communications. The suitable number of reference symbols may be obtained by simulations carried out by using different SNR values or by using information obtained from existing networks one option is using an averaged value based on measurements. The number of reference symbols may also be adjusted to changes in a channel when needed. However, it should be appreciated that the number of reference symbols may be limited. In the LTE, for instance, time division multiplexing allows only limited reference signal control.

Coverage improvement obtained by optimised number of reference symbols may be enhanced by repetition transmissions. Repetition transmission may be carried out by using orthogonal block spreading codes. The block spreading codes may have an inter-cell orthogonal property.

It should be understood that the duration of a transmission period may be extended. The extending may be needed due to spreading and it may be carried out to compensate a decreased bit rate. An example of a transmission period is a transmission time interval (TTI).

It should be understood that due to the spreading, a data rate may remain unchanged.

In an embodiment, a transmission period is user-device specific and dynamically configurable. User devices allocated to a same specific resource may have different transmission periods. Hence, spreading may be extended over multiple subframes by applying an additional overlay cover code between repeated subframes, for instance. Transmission period options and thus spreading sequence lengths as well may be multiples of two. The overlay cover code may be inter-cell orthogonal. The duration of the transmission period may be indicated by an MCS field. Transmission period or length mapping to MCS values may be predetermined or configured via radio resource control signalling.

Spreading sequences may have a "partial orthogonality" property in a similar manner to Walsh-Hadamard codes. Walsh-Hadamard codes are used in variable spreading factor orthogonal frequency code-division multiplexing (VSF-OFCDM), for example. A VSF-codetree structure may be applied to sequence allocation in a following manner: the selected sequence branch within the currently applied VSF-tree may be indicated by a DM RS CSI field and a user device may derive the spreading sequence used by reading cyclic shift indicator indicating the VSF-tree sequence branch up to the sequence length corresponding to the MCS-indicated duration of a transmission period.

Spreading may be constrained to a subframe, and a transmission period may comprise transmissions with different redundancy versions (RV). Thus, different redundancy versions may be used in different subframes.

In the case a subframe has one single carrier frequency division multiple access (SC-FDMA) symbol punctured due to cell-specific sounding reference signal (SRS) resources, one demodulation reference signal (DM RS) block may be dropped. Hence, a need to temporarily shorten spreading sequences due to SC-FDMA symbol puncturing does not exists, and corresponding decrease in multiplexing capacity may thus be avoided.

Additionally, it should be appreciated that adaptive modulation and coding (AMC) set may be limited in a similar manner to H2H communications.

The embodiment ends in block 206. The embodiment is repeatable in many ways. One example is shown by arrow 208 in FIG. 2.

The steps/points, signaling messages and related functions described above in FIG. 2 are in no absolute chronological order, and some of the steps/points may be performed simultaneously or in an order differing from the given one. Other functions may also be executed between the steps/points or within the steps/points and other signaling messages sent between the illustrated messages. Some of the steps/points or part of the steps/points can also be left out or replaced by a corresponding step/point or part of the step/point.

It should be understood that conveying, transmitting and/or receiving may herein mean preparing a data conveyance, transmission and/or reception, preparing a message to be conveyed, transmitted and/or received, or physical transmission and/or reception itself, etc. on a case by case basis. The same principle may be applied to terms transmission, reception and conveyance as well.

An embodiment provides an apparatus which may be any remote-site, server, node (home node, relay node, etc.), host or any other suitable apparatus capable to carry out processes described above in relation to FIG. 2.

FIG. 3 illustrates a simplified block diagram of an apparatus according to an embodiment.

As an example of an apparatus according to an embodiment, it is shown apparatus 300, such as a node, host, server or web stick, including facilities in control unit 304 (including one or more processors, for example) to carry out functions of embodiments according to FIG. 2. The facilities may be software, hardware or combinations thereof as described in further detail below.

In FIG. 3, block 306 includes parts/units/modules needed for reception and transmission, usually called a radio front end, RF-parts, radio parts, radio head, etc.

Another example of apparatus 300 may include at least one processor 304 and at least one memory 302 including a computer program code, the at least one memory and the computer program code configured to, with the at least one processor, cause the apparatus at least to: allocate at least one specific uplink resource to at least one device operable at decreased transmission power and/or bit rate, wherein the at least one specific uplink resource is at least one frequency resource and/or at least one time resource, and wherein the at least one specific uplink resource comprises a plurality of reference symbols, and, if a plurality of devices are allocated, separate the devices on the at least one specific uplink resource by multiplexing, wherein the multiplexing comprises code division multiplexing.

Yet another example of an apparatus comprises means 304 for allocating at least one specific uplink resource to at least one device operable at decreased transmission power and/or bit rate, wherein the at least one specific uplink resource is at least one frequency resource and/or at least one time resource, and wherein the at least one specific uplink resource comprises a plurality of reference symbols, and, if a plurality of devices are allocated, means 304 for separating the devices on the at least one specific uplink resource by multiplexing, wherein the multiplexing comprises code division multiplexing.

Yet another example of an apparatus comprises an allocator configured to allocate at least one specific uplink resource to at least one device operable at decreased transmission power and/or bit rate, wherein the at least one specific uplink resource is at least one frequency resource and/or at least one time resource, and wherein the at least one specific uplink resource comprises a plurality of reference symbols, and a separator configured to separate the devices on the at least one specific uplink resource by multiplexing, wherein the multiplexing comprises code division multiplexing, if a plurality of devices are allocated.

It should be understood that the apparatuses may include or be coupled to other units or modules etc, such as radio parts or radio heads, used in or for transmission and/or reception. This is depicted in FIG. 3 as optional block 306.

Although the apparatuses have been depicted as one entity in FIG. 3, different modules and memory may be implemented in one or more physical or logical entities.

An apparatus may in general include at least one processor, controller or a unit designed for carrying out control functions operably coupled to at least one memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be at least one software application, module, or unit configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. Computer programs may be coded by a programming language, which may be a high-level programming language, such as objective-C, C, C++, C#, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as singlechip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof. For firmware or software, the implementation may be carried out through modules of at least one chip set (e.g., procedures, functions, and so on) that perform the functions described herein. The software codes may be stored in a memory unit and executed by processors. The memory unit may be implemented within the processor or externally to the processor. In the latter case it may be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
at least one processor and at least one memory including a computer program code, the at least one memory and the computer program code configured to, with the at least one processor, cause the apparatus at least to:
allocate at least one specific uplink resource for uplink shared channel data to at least one device operable at decreased transmission power and/or bit rate, wherein the at least one specific uplink resource is at least one frequency resource and/or at least one time resource, and wherein the at least one specific uplink resource comprises a plurality of reference symbols,
if a plurality of devices are allocated, separate the devices on the at least one specific uplink resource by multiplexing, wherein the multiplexing comprises code division multiplexing, and
extend spreading of a transmission over multiple subframes by repeating subframes and applying an additional overlay cover code between repeated subframes.

2. The apparatus of claim 1, wherein the at least specific uplink resource comprises one slot or subframe.

3. The apparatus of claim 1, further comprising the apparatus being caused to:
extend the at least one specific uplink resource to comprise a plurality of slots or subframes.

4. The apparatus of claim 1, wherein the multiplexing further comprises frequency division multiplexing.

5. The apparatus of claim 1, wherein the at least one specific resource corresponds to physical uplink control channel (PUCCH) format 3, or to PUCCH format 3 with extended payload, bandwidth and/or transmission time interval.

6. The apparatus of claim 1, wherein the at least one specific resource is cell specific and signaled to a user device by radio resource control (RRC) signaling or broadcasting.

7. The apparatus of claim 1, wherein the duration of the transmission period is indicated by a modulation and coding scheme (MCS) field.

8. The apparatus of claim 1, further comprising causing the apparatus to:
configure repetition transmission by using orthogonal block spreading codes.

9. The apparatus of claim 1, wherein the overlay cover code is inter-cell orthogonal.

10. The apparatus of claim 1, the apparatus comprising a host, node or server.

11. An apparatus comprising,
at least one processor and at least one memory including a computer program code, the at least one memory and the computer program code configured to, with the at least one processor, cause the apparatus at least to:
allocate at least one specific uplink resource for uplink shared channel data to at least one device operable at decreased transmission power and/or bit rate, wherein the at least one specific uplink resource is at least one frequency resource and/or at least one time resource, and wherein the at least one specific uplink resource comprises a plurality of reference symbols; and
if a plurality of devices are allocated, separate the devices on the at least one specific uplink resource by multiplexing, wherein the multiplexing comprises code division multiplexing,
wherein the allocation further comprises indicating spreading code and demodulation reference signal cyclic shift orthogonal cover code (DM RS OCC) by using demodulation reference signal cyclic shift indicator (DM RS CSI) field in an uplink scheduling grant message.

12. A method comprising:
allocating at least one specific uplink resource for uplink shared channel data to at least one device operable at decreased transmission power and/or bit rate, wherein the at least one specific uplink resource is at least one frequency resource and/or at least one time resource, and wherein the at least one specific uplink resource comprises a plurality of reference symbols;
if a plurality of devices are allocated, separating the devices on the at least one specific uplink resource by multiplexing, wherein the multiplexing comprises code division multiplexing; and
extending spreading of a transmission over multiple subframes by repeating subframes and applying an additional overlay cover code between repeated subframes.

13. The method of claim 12, wherein the at least one specific uplink resource comprises one slot or subframe.

14. The method of claim 12, further comprising extending the at least one specific uplink resource comprise a plurality of slots or subframes.

15. The method of claim 12, wherein the multiplexing further comprises frequency division multiplexing.

16. The method of claim 12, wherein the at least one specific resource corresponds to physical uplink control channel (PUCCH) format 3, or to PUCCH format 3 with extended payload, bandwidth and/or transmission time interval (TTI).

17. The method of claim 12, wherein the at least one specific resource is cell specific and signaled to a user device by radio resource control (RRC) signaling or broadcasting.

18. The method of claim 12, further comprising:
indicating the duration of the transmission period by a modulation and coding scheme (MCS) field.

19. The method of claim 12, further comprising:
configuring repetition transmission by using orthogonal block spreading codes.

20. The method of claim 12, wherein the overlay cover code is inter-cell orthogonal.

21. A method comprising
allocating at least one specific uplink resource for uplink shared channel data to at least one device operable at decreased transmission power and/or bit rate, wherein the at least one specific uplink resource is at least one frequency resource and/or at least one time resource, and wherein the at least one specific uplink resource comprises a plurality of reference symbols;
if a plurality of devices are allocated, separating the devices on the at least one specific uplink resource by multiplexing, wherein the multiplexing comprises code division multiplexing,
wherein the allocation further comprises indicating spreading code and demodulation reference signal cyclic shift orthogonal cover code (DM RS OCC) by using demodulation reference signal cyclic shift indicator (DM RS CSI) field in an uplink scheduling grant message.

22. A non-transitory computer-readable storage medium comprising program code that, when executed by a processor, cause an apparatus at least to perform:
allocating at least one specific uplink resource for uplink shared channel data to at least one device operable at decreased transmission power and/or bit rate, wherein the at least one specific uplink resource is at least one frequency resource and/or at least one time resource, and wherein the at least one specific uplink resource comprises a plurality of reference symbols;
if a plurality of devices are allocated, separating the devices on the at least one specific uplink resource by multiplexing, wherein the multiplexing comprises code division multiplexing; and
extending spreading of a transmission over multiple subframes by repeating subframes and applying an additional overlay cover code between repeated subframes, wherein the overlay cover code is inter-cell orthogonal.

23. The non-transitory computer-readable storage medium of claim 22, wherein the at least one specific uplink resource comprises one slot or subframe.

24. The non-transitory computer-readable storage medium of claim 22, wherein the computer program code further causes the apparatus to perform: extending the at least one specific uplink resource to comprise a plurality of slots or subframes.

25. The non-transitory computer-readable storage medium of claim 22, wherein the multiplexing further comprises frequency division multiplexing.

26. The non-transitory computer-readable storage of claim 22, wherein the at least one specific resource corresponds to physical uplink control channel (PUCCH) format 3, or to PUCCH format 3 with extended payload, bandwidth and/or transmission time interval (TTI).

27. The non-transitory computer-readable storage of claim 22, wherein the at least one specific resource is cell specific and signaled to a user device by radio resource control (RRC) signaling or broadcasting.

28. The non-transitory computer-readable storage medium of claim 22, wherein the computer program code further causes the apparatus to perform:
indicating the duration of the transmission period by a modulation and coding scheme (MCS) field.

29. The non-transitory computer-readable storage medium of claim 22, wherein the computer program code further causes the apparatus to perform:
configuring repetition transmission by using orthogonal block spreading codes.

30. The non-transitory computer-readable storage medium of claim 22, wherein the overlay cover code is inter-cell orthogonal.

31. A computer program embodied on a computer-readable storage medium, the computer program comprising program code for controlling a process to execute a process, the process comprising:
allocating at least one specific uplink resource for uplink shared channel data to at least one device operable at decreased transmission power and/or bit rate, wherein the at least one specific uplink resource is at least one frequency resource and/or at least one time resource, and wherein the at least one specific uplink resource comprises a plurality of reference symbols;
if a plurality of devices are allocated, separating the devices on the at least one specific uplink resource by multiplexing, wherein the multiplexing comprises code division multiplexing,
wherein the allocation further comprises: indicating spreading code and demodulation reference signal cyclic shift orthogonal cover code (DM RS OCC) by using demodulation reference signal cyclic shift indicator (DM RS CSI) field in an uplink scheduling grant message.

* * * * *